3,247,275
PROCESS FOR THE PREPARATION OF 3- AND 4-
ETHYLDIPHENYL
Frederick J. Soderquist, Essexville, Jerome H. Stickelmeyer, Midland, and Harold D. Boyce, Coleman, Mich., assignors to The Dow Chemical Company, Midland, Mich., a corporation of Delaware
No Drawing. Filed Mar. 18, 1963, Ser. No. 266,017
5 Claims. (Cl. 260—671)

This invention relates to a process for the preparation of ethyldiphenyls wherein diphenyl is ethylated in the presence of a Friedel-Crafts catalyst. A more particular aspect of this invention is the ethylation of diphenyl under conditions which minimize the formation of 2-ethyldiphenyl and increase the yield of 3- and 4-ethyldiphenyl.

The ethyldiphenyls are used to prepare vinyldiphenyls by dehydrogenating the ethyl compound. The vinyldiphenyls can be copolymerized with butadiene to produce an elastomer which is useful in preparing high impact polystyrene resins having improved transparency. Ethyldiphenyls may be produced by the alkylation of diphenyl with ethylene or an ethylene-yielding compound such as diethylbenzene. The product of this reaction is a mixture of the ortho, meta, and para, i.e., 2-, 3-, and 4-isomers of ethyldiphenyl. The ethyldiphenyls produced in this manner are dehydrogenated to produce the desired vinyl monomers for polymerization. The 2-isomer of vinyldiphenyl is extremely unstable, with the vinyl group readily connecting the two phenyl groups between their 2-positions to produce the 5-member cyclic group in 9-methylfluorene in the following manner:

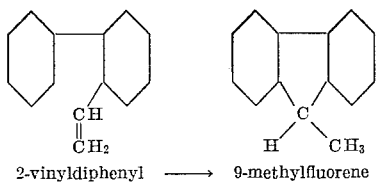

2-vinyldiphenyl ⟶ 9-methylfluorene

This compound dehydrogenates readily to 9-methylenefluorene which polymerizes spontaneously and is recovered from the dehydrogenated product as poly-9-methylenefluorene, thereby constituting a loss of reactants. To prevent this loss it is necessary to separate the 2-isomer from the 3- and 4-isomers of ethyldiphenyl prior to the dehydrogenation step. This separation is difficult owing to the proximity of the boiling points of these isomers. Additionally, some cyclization of the 2-ethyl compound to the fluorene occurs in the presence of the alkylation catalyst resulting in loss of material in this step of the process. Therefore, it is desirable to minimize the yield of the 2-isomer. This problem is unique to ethylated diphenyl for the reason that cyclization is not a problem with methylated diphenyl and the next higher homolog, propyldiphenyl, does not easily form the ortho isomer owing to steric hindrance.

We have discovered a process for overcoming this loss of product by cyclization and polymerization of the 9-methylenefluorene. More particularly our process provides means for minimizing the production of the 2-isomer and enhancing the selectivity to the 3- and 4-isomers of ethyldiphenyl. This improved process is accomplished by a unique selection of the conditions under which the alkylation is performed.

According to our invention, diphenyl is alkylated with an ethylene-yielding compound in the presence of a Friedel-Craft catalyst having a concentration between about 1 and 5 percent and preferably 2.5–3.5 percent of the weight of the diphenyl. Additionally, the reaction is carried out at a temperature between about 80° and 110° C. preferably about 85–95° C. for a period between about 3 and 24 hours and preferably about 3–12 hours. Moreover, the amount of ethylene present should be from about 0.3 to about 1.0 and preferably about 0.3–0.7 mole of ethylene-yielding material per mole of diphenyl. Ethylene-yielding materials which may be used in practicing our invention include ethylene, ethyl chloride, ethyl, alcohol, and diethyl benzene as well as other ethylene derivatives known to be alkylating agents.

The alkylation may be carried out by mixing the diphenyl and the alkylating agent with the catalyst in a reaction chamber. In some instances, it may be desirable to employ a solvent such as benzene to prevent the solidification of the diphenyl at low temperature. The temperature of the reactor is then increased to the desired operating level and held there for the necessary time. When ethylene is used as the alkylating agent it may not be practical to charge the reactor initially with the entire amount to be reacted with the diphenyl owing to its high vapor pressure. Therefore, it is preferred to add the ethylene either continuously or intermitently as it reacts with the diphenyl.

Upon the completion of the alkylation the liquid phase may be separated from the catalyst by a dilute caustic wash then subjected to a stripping operation to separate solvent, unreacted diphenyl and 2-ethyldiphenyl from the desired 3- and 4-isomers of ethyldiphenyl. The 2-isomer recovered in this manner may be charged to a subsequent alkylation step where at least a part of it will be isomerized to the desired 3- and 4-isomers.

The effect of reaction conditions on product selectivity according to this invention is illustrated by the data in Table I. Runs 1–7 involved the alkylation of diphenyl with ethylene in the presence of an aluminum chloride catalyst at the conditions given in the table. The effects of different variables on product selectivity can be seen in the ratios of the isomers of ethyldiphenyl which were in the reaction products. The concentration of aluminum chloride is expressed as percent of the weight of the diphenyl in the reaction mixture.

TABLE I.—ETHYLATION OF DIPHENYL

| Run No. | Reaction Time, Hours | Reaction Temp., °C. | AlCl₃, Weight Percent | Reactants Molar Ratio, Ethylene/Diphenyl | Products Isomer Ratio, 3+4/2 |
|---|---|---|---|---|---|
| 1 | 6 | 80 | 1 | 1:1 | 1.3 |
| 2 | 24 | 80 | 1 | 1:1 | 2.6 |
| 3 | 6 | 80 | 5 | 1:1 | 2.9 |
| 4 | 18 | 80 | 5 | 1:1 | 11.8 |
| 5 | 6 | 110 | 1 | 1:1 | 8.4 |
| 6 | 12 | 80 | 1 | 0.5:1 | 6.4 |
| 7 | 3 | 110 | 1 | 0.5:1 | 7.2 |
| 8 | 5 | 85 | 3.5 | 0.34:1 | 10.3 |

Referring to Runs 1 and 2 it is seen that a slight improvement in product selectivity can be obtained by increasing reaction time from 6 to 24 hours with the other operating conditions of temperature, catalyst concentration, and reactant ratio at the outside limits of the operating range. Also, comparing Runs 1 and 3 it is seen that a similar improvement is obtained by increasing the catalyst concentration from 1 to 5 weight percent rather than increasing the reaction time as in Run 2. A substantial increase in the product ratio was obtained in Run 4 where both the reaction time and catalyst concentration were increased. To obtain maximum use of the processing equipment it is desirable to keep the reaction time as low as possible, however this aim cannot be achieved simply by increasing catalyst concentration for the reason that catalyst complexes are produced at high catalyst concentrations resulting in loss of both reactants and catalyst. Another problem is that long reaction times favor the formation of 9-methylfluorene. The data in Run 5 demonstrate the improved product selectivity which is obtained by operating at the upper temperature limit, however, the improvement to be obtained by operating at higher temperatures is subject to the loss of product by dehydrogenation of the 2-isomer and subsequent cyclization to 9-methylfluorene at higher temperatures and particularly in the presence of high catalyst concentration. The data in Run 6 illustrate the fact that a desirable product ratio may be obtained at the lower limit of reaction temperature and an intermediate reaction time by using a lower ratio of ethylene to diphenyl in the reaction mixture. The results of Run 7 further show that approximately the same product ratio as in Run 6 may be obtained at a lower reaction time with a higher reaction temperature.

As previously stated these runs were made using ethylene as the alkylating agent. To avoid high initial pressures in the reactor a portion of the ethylene was added at the start of the reaction then incremental additions were made as the reaction proceeded and the pressure in the reactor declined. Run 8 illustrates the reaction carried out with a low vapor pressure ethylene-yielding material instead of gaseous ethylene. In this run diethylbenzene was used as the alkylating agent with the entire charge being made to the reactor at the start of the run. The conditions of this reaction are within the preferred range. It is seen that a desirable product selectivity is obtained when this type of alkylating agent is employed at similar reaction conditions.

From the foregoing it can be seen that greatly superior product selectivity can be realized by alkylating under conditions within the preferred range while slightly less favorable yields are obtained at conditions within the general range taught and lying outside the preferred range. In this manner the yield of the 2-isomer can be suppressed, thereby avoiding the loss of reactants in producing the by-product poly-9-methylenefluorene. At the greatly reduced yield of the 2-isomer of ethyldiphenyl it becomes economical to eliminate the step of separating this isomer from the desired isomers prior to the dehydrogenation step, thereby eliminating the expense of that operation.

Although our invention has been described with particular reference to the use of aluminum chloride as the catalyst, it should be understood that other Friedel-Crafts catalysts such as $AlBr_3$, $H_2SO_4$, HF, $BF_3$, etc., may be used in place of $AlCl_3$. The pressure ordinarily employed is simply that which is necessary to maintain some alkylating agent in the liquid phase, therefore normally liquid agents such as diethylbenzene permit the use of a lower pressure than that required for ethylene. Also, a solvent such as benzene or toluene may be used to depress the volatility of the alkylating agent.

The reaction may be conducted either as a batch process or as a continuous operation. In the latter, the diphenyl and alkylating agent are charged to the reactor continuously along with the catalyst. The reactor size and feed rates are correlated to provide the desired residence (reaction) time. The product stream withdrawn from the reactor is processed similar to that from the batch process to separate the catalyst and recover the desired isomers of ethyldiphenyl. The 2-isomer may be returned to the reactor for isomerization to the desired isomer.

We claim:
1. A process for ethylating diphenyl wherein the yield of 3- and 4-ethyldiphenyl is increased while that of 2-ethyldiphenyl is suppressed comprising:
   combining as reactants an ethylene-yielding compound and diphenyl in the presence of a Friedel-Crafts catalyst, the ratio of said ethylene-yielding compound to said diphenyl being sufficient to provide from about 0.3 to about 1.0 mole of ethylene per mole of diphenyl and the concentration of said catalyst being from about 1 to 5 percent by weight of said diphenyl and,
   maintaining the temperature of said reactants and catalyst between about 80° and 110° C. for a period between about 3 and 24 hours.

2. A process according to claim 1 wherein said ethylene yielding compound is diethylbenzene.

3. A process for ethylating diphenyl wherein the yield of 3- and 4-ethyldiphenyl is increased while that of 2-ethyldiphenyl is suppressed comprising:
   combining ethylene and diphenyl as reactants in a ratio of about 0.3 to 0.7 mole of ethylene per mole of diphenyl in the presence of a Friedel-Crafts catalyst, the concentration of said catalyst being from about 2.5 to about 3.5 percent by weight of said diphenyl, and
   maintaining the temperature of said reactants and catalyst at about 85–95° C. for a reaction period of about 3 to 12 hours, thereafter
   recovering said 3- and 4-ethyldiphenyl therefrom.

4. A process according to claim 3 wherein said ethylene is added to said reactor incrementally throughout said reaction period.

5. A process for ethylating diphenyl wherein the yield of 3- and 4-ethyldiphenyl is increased while that of 2-ethyldiphenyl is suppressed comprising:
   charging to a reactor a reactant mixture of ethylene, diphenyl and aluminum chloride, the mole ratio of ethylene to diphenyl being from about 0.3:1 to about 0.7:1 and the concentration of aluminum chloride being from about 2.5 to about 3.5 percent by weight of said diphenyl,
   maintaining the temperature of said reactor at about 85–95° C.,
   continuing to charge said reactant mixture to said reactor and withdrawing products therefrom at a rate which provides a residence time therein of about 3 to 12 hours,
   recovering said ethyldiphenyls from said withdrawn products, then
   separating 2-ethyldiphenyl from 3- and 4-ethyldiphenyl and returning said 2-ethyldiphenyl to said reactor.

References Cited by the Examiner
UNITED STATES PATENTS

| | | | |
|---|---|---|---|
| 2,172,391 | 9/1939 | Krase | 260—671 |
| 2,324,784 | 7/1943 | Lieber | 260—671 |

DELBERT E. GANTZ, *Primary Examiner.*

C. R. DAVIS, *Assistant Examiner.*